Feb. 15, 1955  D. M. LEUPKE  2,702,131
HAY BALE STACKER
Filed Feb. 24, 1953  6 Sheets-Sheet 1
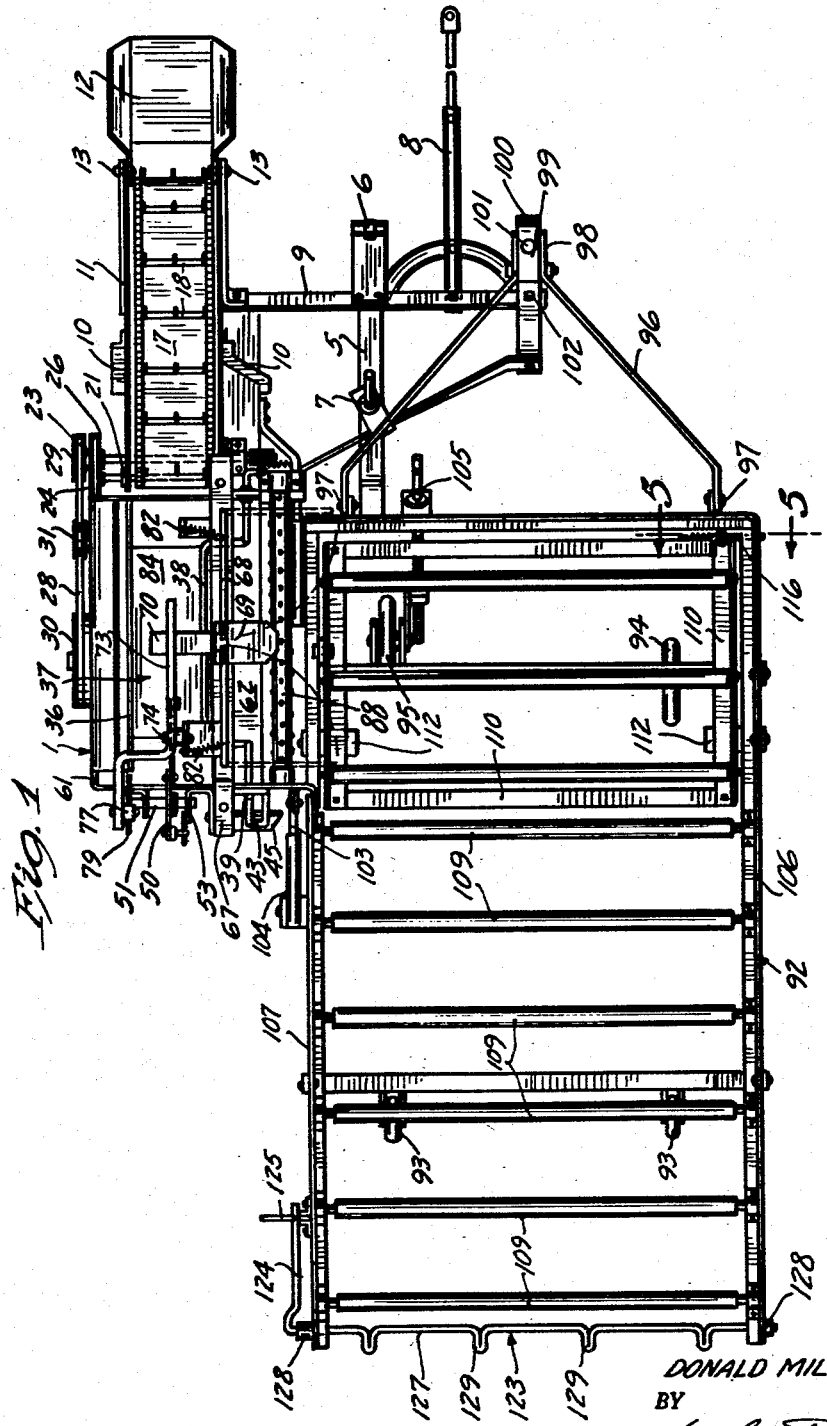
INVENTOR.
DONALD MILTON LEUPKE
BY
Merchant & Merchant
ATTORNEYS Feb. 15, 1955  D. M. LEUPKE  2,702,131
HAY BALE STACKER
Filed Feb. 24, 1953  6 Sheets-Sheet 2
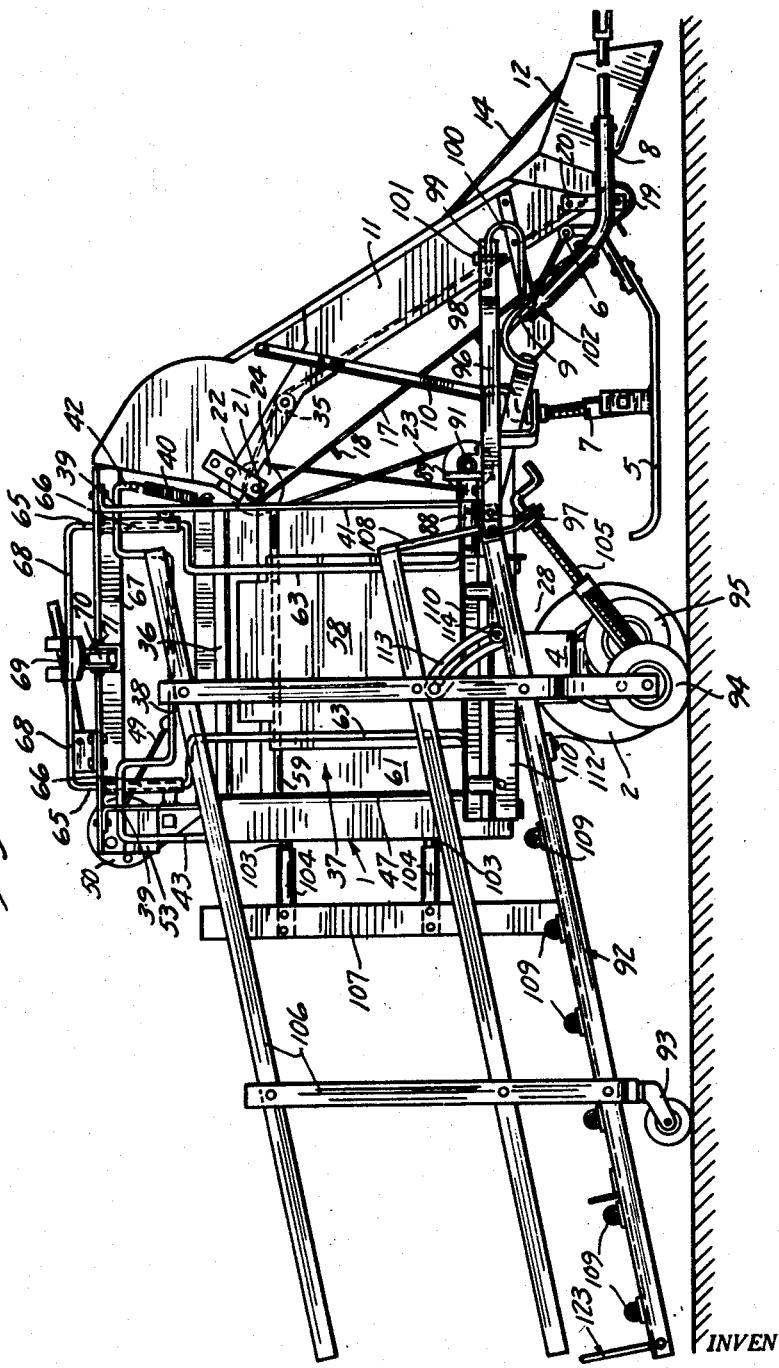
INVENTOR.
DONALD MILTON LEUPKE
BY
Merchant&Merchant
ATTORNEYS Feb. 15, 1955 D. M. LEUPKE 2,702,131
HAY BALE STACKER
Filed Feb. 24, 1953 6 Sheets—Sheet 3
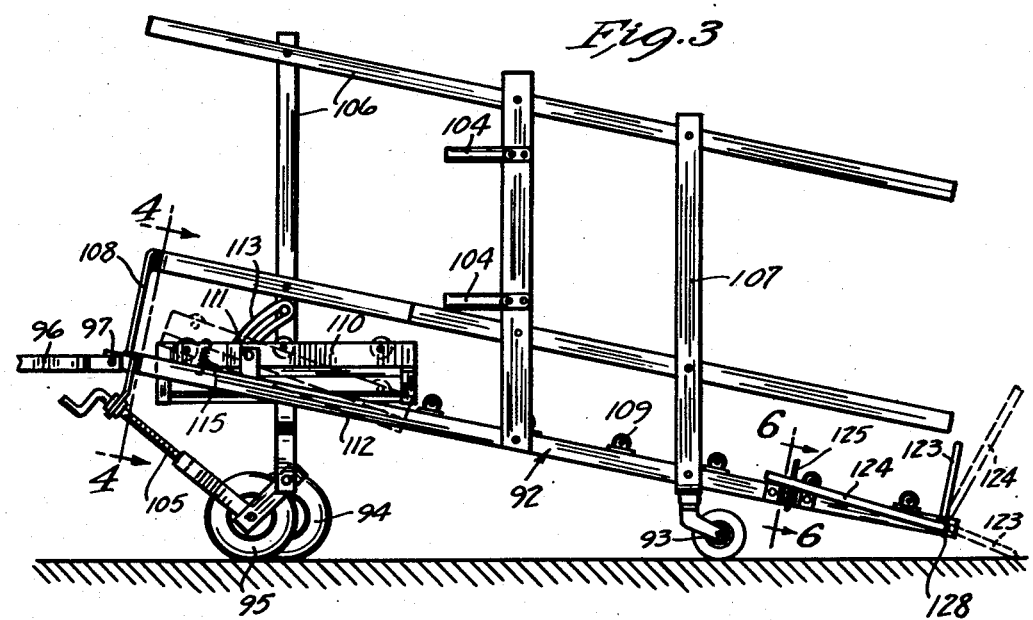
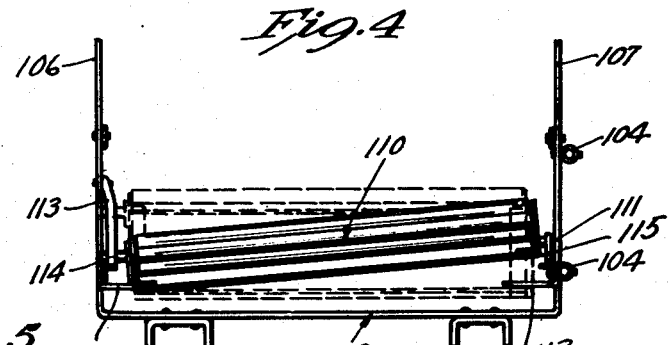
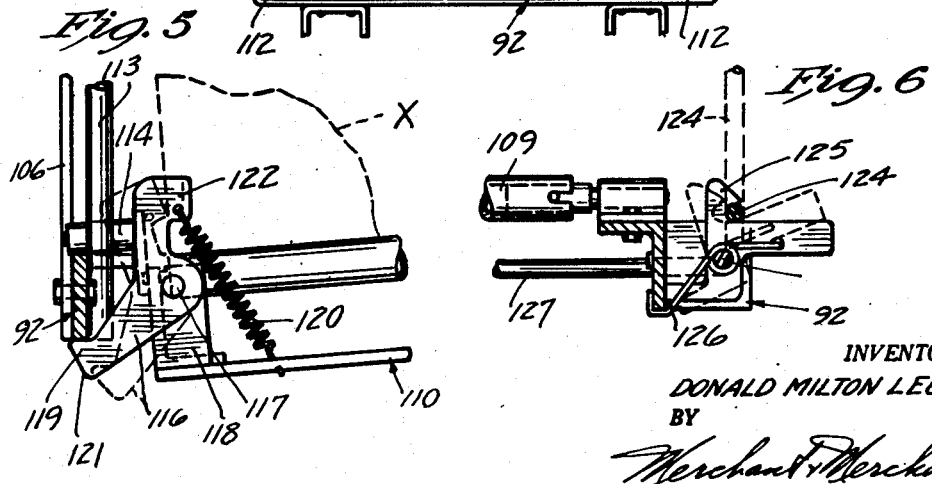
INVENTOR.
DONALD MILTON LEUPKE
BY
Merchant & Merchant
ATTORNEYS Feb. 15, 1955  D. M. LEUPKE  2,702,131
HAY BALE STACKER
Filed Feb. 24, 1953  6 Sheets-Sheet 4
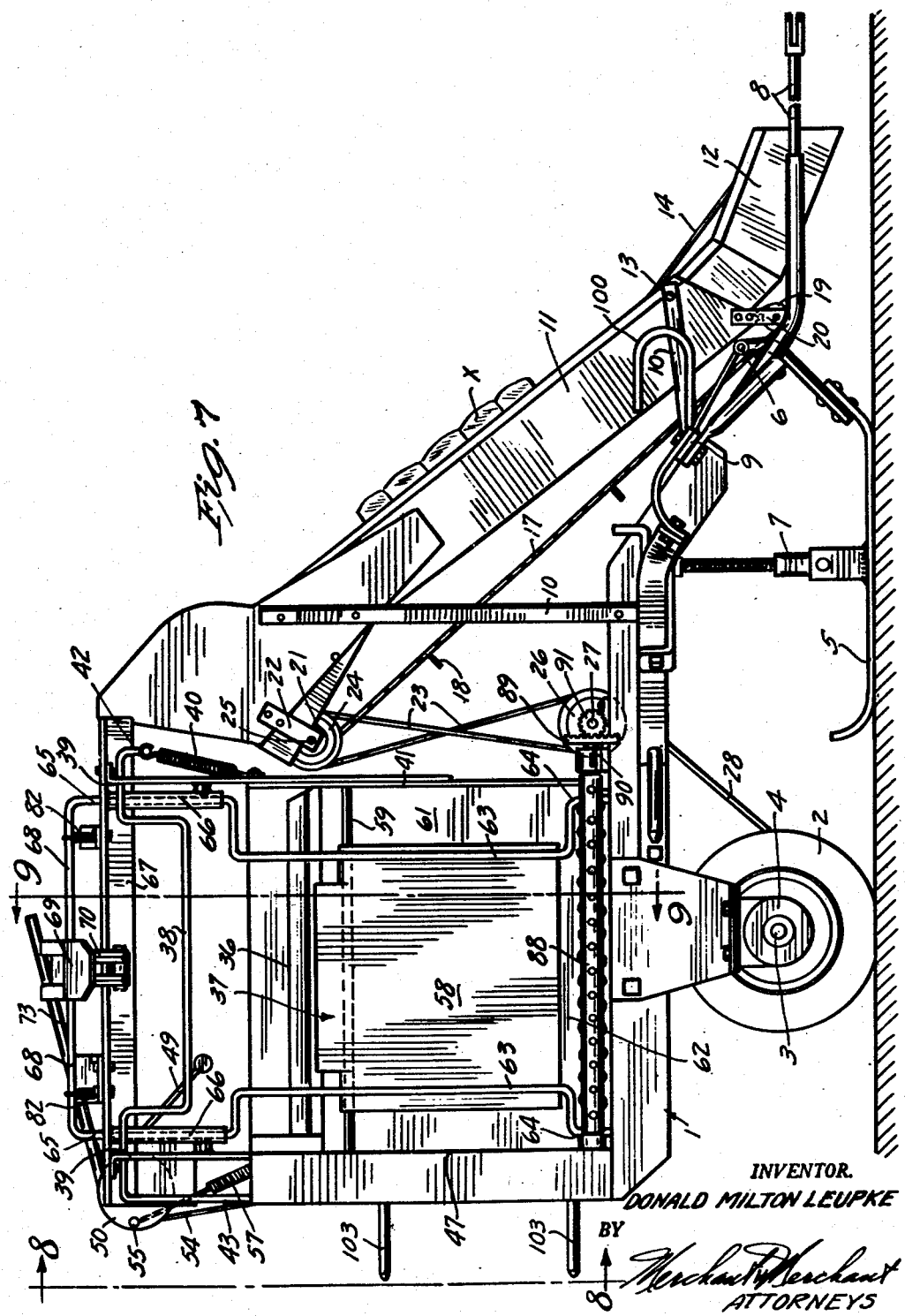
INVENTOR.
DONALD MILTON LEUPKE
BY
Merchant & Merchant
ATTORNEYS

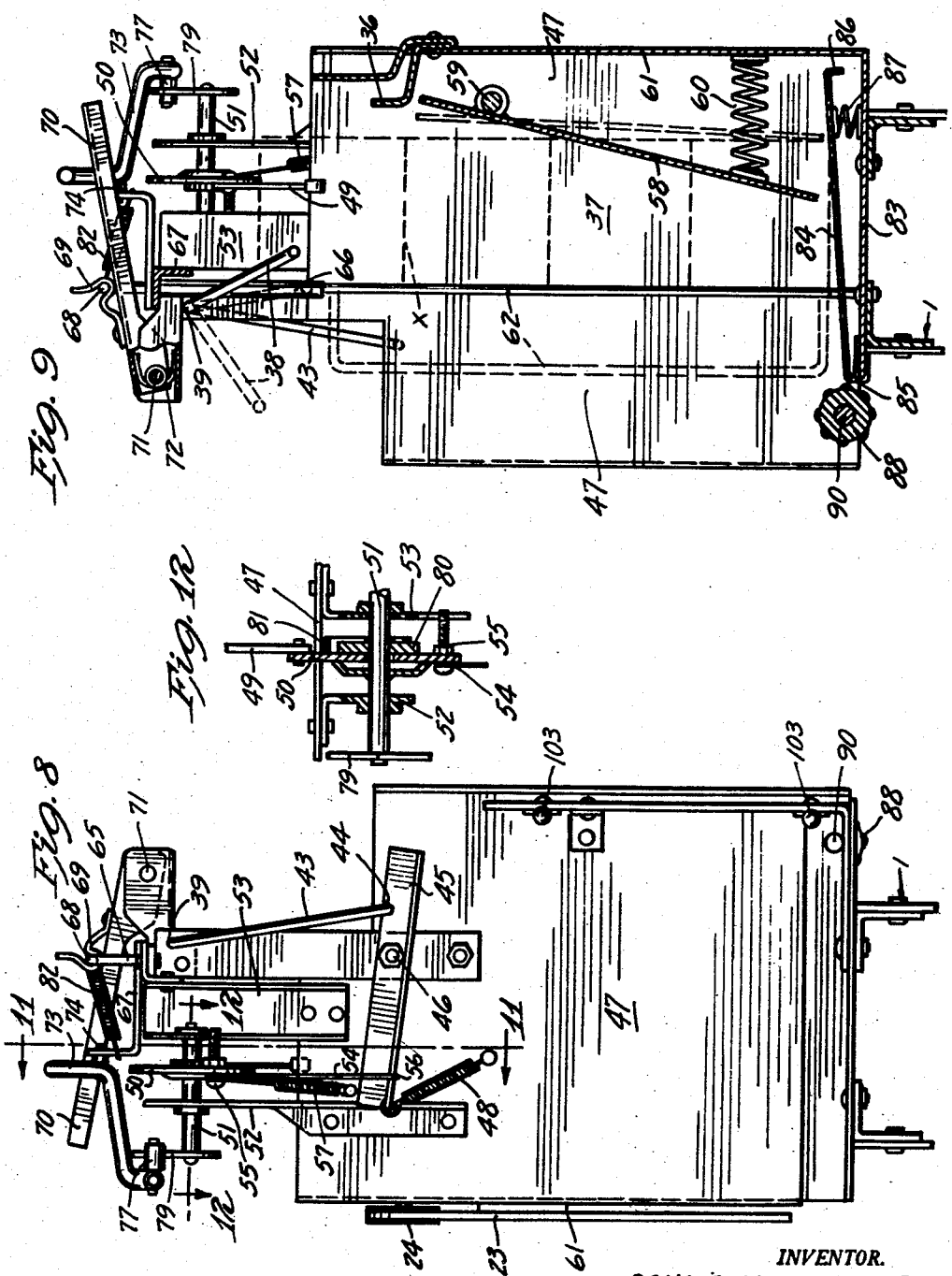

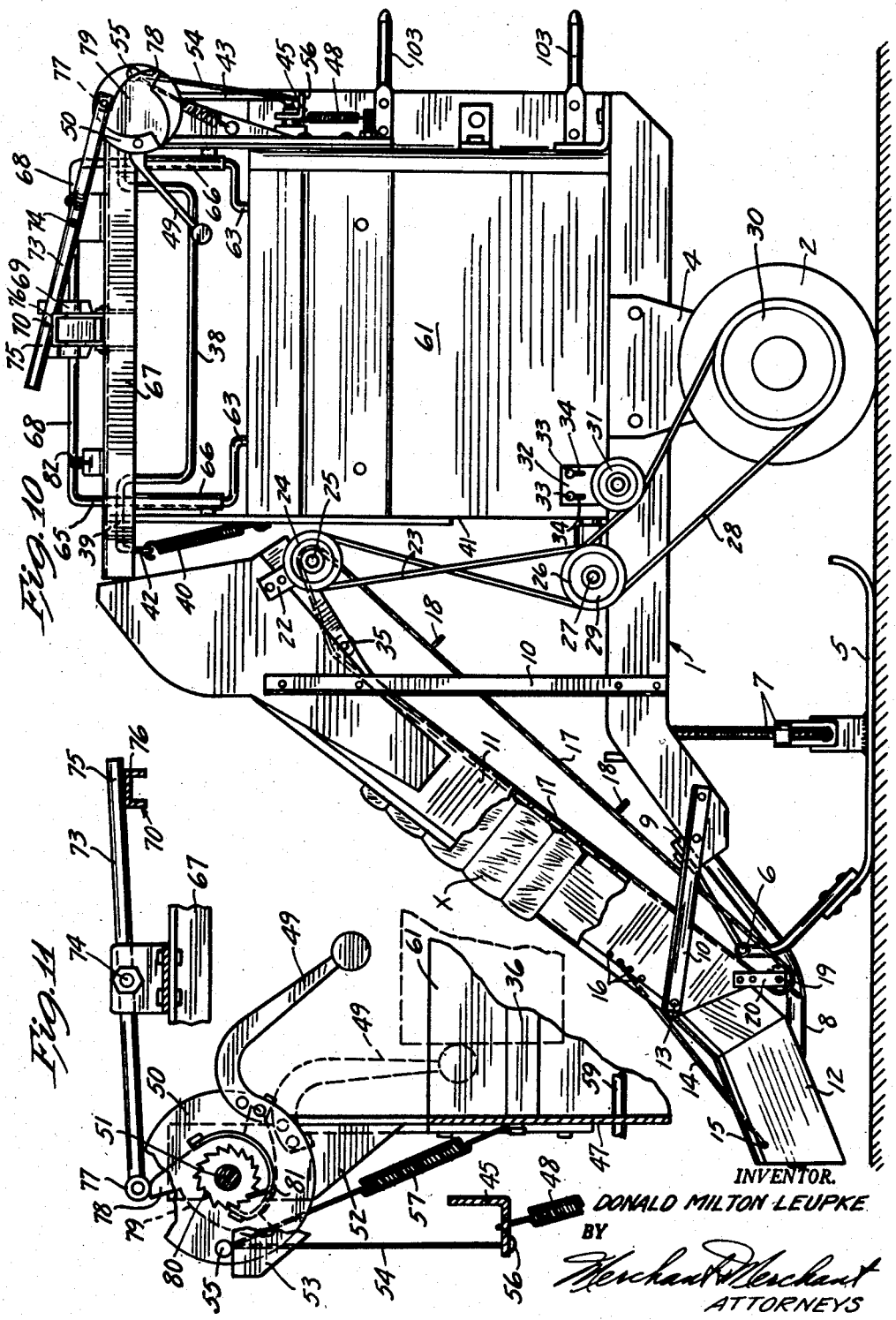

United States Patent Office

2,702,131
Patented Feb. 15, 1955

---

2,702,131

HAY BALE STACKER

Donald Milton Leupke, Granite Falls, Minn.

Application February 24, 1953, Serial No. 338,213

12 Claims. (Cl. 214—6)

My invention relates generally to agricultural implements and more specifically to devices for collecting from the field, and stacking, hay which has been previously baled.

The primary object of my invention is the provision of a power operated mobile structure which will, merely upon proper guidance thereof, automatically pick up the generally rectangular hay bales and arrange same in stacks of a pre-determined height.

A still further object of my invention is the provision of devices of the class immediately above described which will automatically arrange said stacked bales in side by side relationship whereby to form a master stack of several rows deep and several rows wide.

A still further object of my invention is the provision of a device of the type immediately above described which is provided with means, whereby said master stack may be readily released from said mobile structure and deposited in a desired spot upon the ground.

A still further object of my invention is the provision of a device of the class described which comprises primary and secondary units, the first of which is provided with a pick up conveyor and a stacking chamber, and the second of which is provided with means for automatically arranging the stacks automatically discharged from said chamber in side by side relation to form said master stack. The two units above described may be readily coupled together or uncoupled for convenience of storage, transportation, and the like.

A still further object of my invention is the provision of a stacking device as set forth which is highly efficient in operation and which is rugged in construction and durable in use.

The above and still further objects of my invention will become apparent from the following detailed specification, appended claims and attached drawings.

Referring to the drawings, wherein like characters indicate like parts throughout the several views:

Fig. 1 is a view in top plan;

Fig. 2 is a view in side elevation;

Fig. 3 is a view in side elevation of the secondary mobile frame and structure mounted thereon;

Fig. 4 is a view partly in front elevation and partly in section taken substantially on the line 4—4 of Fig. 3;

Fig. 5 is an enlarged fragmentary view partly in section and partly in front elevation taken substantially on the line 5—5 of Fig. 1;

Fig. 6 is an enlarged fragmentary detail in section taken on the line 6—6 of Fig. 3;

Fig. 7 is a view in side elevation of the primary frame of my invention carrying the gathering and stacking elements thereof;

Fig. 8 is a view in rear elevation as seen from the line 8—8 of Fig. 7;

Fig. 9 is a vertical section taken substantially on the line 9—9 of Fig. 7;

Fig. 10 is a view in elevation as seen from the opposite side with respect to Fig. 7, some parts being broken away and some parts being shown in section;

Fig. 11 is an enlarged fragmentary detail taken substantially on the line 11—11 of Fig. 8; and Fig. 12 is a transverse section taken substantially on the line 12—12 of Fig. 8.

Referring with greater particularity to the drawings, the generally rectangular primary frame is identified by the numeral 1. Projecting laterally outwardly on one side of the frame 1, intermediate its forward and rearward ends, is a ground wheel 2 fast on a shaft 3 journalled by suitable bearing bracket 4. On its opposite side the frame 1 is provided with a ground engaging skid 5, the forward end of which is pivotally secured thereto as at 6 to permit raising and lowering thereof through the medium of a screw jack, identified in its entirety by the numeral 7. The jack 7 is elongated so as to lower the skid 5 to the ground engaging position of Figs. 7 and 10 only when the primary frame 1 is detached from the secondary frame hereinafter to be described. A draw bar 8, for detachable attachment to a tractor or the like, is rigidly secured to a laterally inwardly projecting arm 9.

Rigidly mounted to the forward portion of the main frame 1, by means of bars or the like 10, is an upwardly and rearwardly sloping trough 11 which, preferably and as shown, has a bale pick up scoop 12 pivotally secured, as at 13, to the lower end thereof. Vertical adjustments of the forward free end of the scoop 12 may be achieved through the medium of a rod 14 which is pivoted to the outer end portion of the scoop 12, as at 15, and has its hook-acting end selectively engageable with one of the longitudinally-spaced openings 16 in the trough 11. A conventional endless conveyor belt 17, preferably and as shown being provided with longitudinally-spaced bale pick up cleats 18, is shown as running over an idler roller 19, suitably journalled in depending bracket forming arms 20 at the lower end of the trough 11, and a drive roller 21 journalled in laterally-spaced bracket bars 22 adjacent the upper end of the trough 11. In this manner, the delivery flight of the conveyor belt 17 runs over the bottom of the trough 11, whereas the return flight thereof is positioned beneath said bottom. Driving rotation may be imparted to the drive roller 21 by any suitable means such as a belt 23 running over a sheave 24 fast on the outer end of the shaft 25 upon which the roller 21 is secured. The belt 23 runs over a sheave 26, see Fig. 1, on a shaft 27 journalled in the frame 1 below the sheave 24. A second endless belt 28 runs over a second pulley 29 also secured to idler shaft 27 in laterally-spaced relation to sheave 26. Belt 28 runs over an enlarged drive shaft 30 fast on the outer portion of wheel 2. Preferably and as shown, the belt 28 may be tightened by means of an idler roller 31 mounted in a bearing plate 32 for vertical adjustments through the medium of headed bolts 33 projecting through slots 34.

From the above it should be obvious that as forward motion is imparted to the frame 1, through the medium of ground wheel 2, a bale of hay or the like X will be picked up by the scoop 12 when the free end thereof has been lowered to a desired spacing from the ground. Continued forward motion of the frame 1 and associated parts, and particularly engagement of a second bale X, will result in the bale being forced upwardly into the trough 11 to the point where it will be engaged by a cleat 18 on the conveyor 17. The bale X will then be elevated upwardly along the conveyor 17 to the roller 35 from whence, and until the drive roller 21 is reached, a lesser degree of pitch will be given thereto, preparatory to its engaging of a rearwardly disposed horizontal supporting shelf or rail 36 adjacent the outer side of the frame 1 and overlying a bale stacking chamber, identified in its entirety by the numeral 37. As shown particularly in Fig. 9, the rail element 36 is adapted to engage the bale X only adjacent one side thereof. The opposite side of the bale X, midway its upper and lower extremities, is engaged by a movable generally U-shaped bale supporting element 38 (see particularly Figs. 7, 9 and 10), opposite outturned ends of which are journalled on a horizontal axis, as indicated at 39. As shown, particularly in Fig. 9, engagement of the bales X with the movable bale supporting member 38 causes the bales X to shift laterally slightly so as to facilitate deposit of the bales X into the stacking chamber 37 by forward rolling motion thereof. A coil spring 40, interposed between the front wall 41 of the stacking chamber 37 and the crank-acting free end 42 of the member 38, biases same toward the bale engaging position of Fig. 9. The gravity bias of a bale X against the movable bale supporting member 38, however, is greater than the bias exerted thereagainst by the spring 40. Therefore, when a depending latch arm 43 is released from a notch 44 in a latch lever 45, centrally pivoted at 46, to the rear wall element 47 of the stacking chamber 37, said movable bale engaging element 38 will swing outwardly to permit deposit of the bale X into the chamber 37. The latch lever 45 is yieldingly biased toward locking engagement with the latch arm 43 by means of a coil tension spring 48.

In order to unlock the latch arm 43 from the latch lever 45, so as to drop the bales X into the stacking chamber 37, I provide the following mechanism:

As shown, I provide a bale engaging arm 49 projecting forwardly in a position overlying the stacking chamber 37 and in the path of travel of a bale X being delivered thereto from a conveyor 17. The arm 49 is rigidly secured at its rear end to a disc-like member 50 that is mounted fast on a shaft 51 extending transversely of the frame 1 and journalled in suitable bearing brackets 52 and 53. A pull rod or link 54 is secured at its upper end to the disc-like member 50, as indicated at 55, and at its lower end to the latch lever 45, as indicated at 56. A rearward movement of a bale X being delivered to the chamber 37 will cause the arm 49 to swing from its full line position of Fig. 11 to its latch-releasing dotted line position of Fig. 11 to unlock the bale supporting member 38. A coil tension spring 57 has its opposite ends connected respectively to the disc-like member 50 and to the rear wall 47 of the stacking chamber 37 whereby to yieldingly bias the disc-like member 50 and arm 49 to its full line position of Fig. 11.

The stacking chamber 37 is provided with a rear wall element 58, preferably and as shown being pivotally secured adjacent its upper edge on opposed pivot pins 59 projecting inwardly from the forward and rearward walls 41 and 47 of said chamber 37. As shown, a coil compression spring 60 is interposed between the lower end portion of the rear wall element 58 and the permanent rear wall 61 of the chamber 37 whereby to bias bales X stacked within the chamber 37 outwardly through the open side 62 of the chamber. Open side 62 of the chamber 37 is normally partially closed by means of cooperating opposed generally U-shaped gate elements 63, which, as shown in Fig. 7, are spaced apart in their closed position a distance less than the length of a bale X within the chamber 37. The lower outturned trunnion forming ends 64 of the gate elements 63 are suitably journalled on a vertical axis in the frame 1, whereas the aligned trunnion acting upper ends 65 thereof are suitably journalled in bearing sleeves 66 carried by the super structure 67. As shown, the gate elements 63 are formed from rod stock and have their extreme upper ends bent angularly to provide opposed locking arms 68, the free ends of which are adapted to be received within latch 69 carried by a latch lever 70 which is mounted on the super structure 67 and pivotally secured in overlying relation to the open side 62 intermediate said gates 63, as indicated at 71. A torsion spring 72 biases said latch lever 70 in a direction to lock the opposed locking arms 68 within said latch 69. In order to impart unlatching movements to the latch arm 70 whereby to permit the opening of the opposed gates 63 so that the bales X within the stacking chamber 37 may be moved laterally outwardly through the open side 62 of said chamber 37, I provide the following mechanism:

A tripping arm 73 is pivotally secured intermediate its ends, as indicated at 74, for rocking movements of its free end 75 from a position to engage and depress the free end 76 of the latch lever 70, so as to release the locking arms 68 from the latch 69, to an elevated position permitting said latch 70 to return to locking position. The opposite end of the tripping arm 73 is provided with a cam follower roller 77 which is adapted to engage the circumferentially-spaced lobes 78 of a cam 79 that is rigidly mounted on the shaft 51. A ratchet 80 is mounted fast on the shaft 51 at one side of the disc-like member 50, and is engaged by a pawl-acting spring 81 rigidly secured to the disc-like member 50.

The operation of the mechanism for opening and closing the gates 63 is as follows:

When a given bale X is propelled along the bale supporting rail 36 and its opposite side in engagement with the U-shaped bale support 38 (by engagement with the bale X immediately therebehind), it engages the arm 49 and pushes same to the dotted line position of Fig. 11 advancing the rotary disc 50 on the shaft 51 and the ratchet 80, also fast thereon. Pawl 81 retains the ratchet 80 in its progressed position. As described supra, this rearward movement of the arm 49 causes rocking movements to be imparted to the latch lever 45 whereby to release the latch arm 43 from the notch 44. Bale X is, therefore, dropped into the bottom of the stacking chamber 37 moving the rear wall element 58 to the dotted line position of Fig. 9 against the bias of spring 60. As the shaft 51 rotates, the cam 79 also rotates whereby to cause the roller equipped end 77 of the tripping arm 73 to ride progressively up each of the lobes 78. The teeth on the ratchet 80 are so spaced in size as to require a desired number of independent movements of the arm 49 by separate bales in order that the free end 75 of the tripping arm 73 depress the latch lever 70 sufficiently to release the opposed locking arms 68 from the latch 69. Simultaneously the roller equipped end 77 of the tripping arm 73 drops off the lobe 78, and the process is repeated. In the meantime a desired number of bales X are stacked within the chamber 37, and when the gates 63 are unlatched, as above described, the stack will be forced outwardly through the open side 62 against the bias of springs 82. Obviously, the tension exerted against the stacked bales by the spring 60 is greater than that exerted against the gates 63 by said spring 82. Also preferably and as shown, the bottom 83 of the stacking chamber 37 is provided with a false bottom element 84, which is secured to the frame 1 adjacent the open side 62 of the chamber 37, as indicated at 85, and has its free end 86 biased upwardly to a plane above the end 86 by means of a coil compression spring 87. In this manner, a bottom which slopes in the direction of a mechanically driven feed roller 88 is achieved. It should be understood that sufficient movement will be imparted to the stacked bales by means of the spring biased wall element 58 to cause same to engage the feed roller 88. Feeding movements are imparted to the feed roller 88 by means of a ring gear 89 fast on the outer end of the shaft 90 upon which the roller 88 is fastly secured. Ring gear 89 is in turn rotated by means of a pinion 91 fast on the shaft 27.

For the purpose of receiving the stacked bales being discharged from the stacking chamber 37, and thereafter arranging said stacks in side by side relationship to form a master stack several rows deep and several rows wide, I provide a secondary mobile frame 92, preferably and as shown being rectangular in form and being mounted on a pair of spaced caster wheels 93 adjacent its rear end and spaced wheels 94 and 95 adjacent its forward end. Means for detachably securing the secondary mobile frame 92 to the primary frame 1 include a yoke-like draft member 96 pivotally secured to opposite sides of the front portion of the frame 92, as indicated at 97. Pivotally secured between its converging forward ends 98 of the draft member 96 is a clevis 99 adapted to be secured to a tongue 100 by means of a headed pin or the like 101. As shown, tongue 100 is secured, as at 102, to the extreme outer end portion of the arm 9. Also preferably and as shown, a plurality of longitudinally extended rearwardly projecting coupler pins 103 operatively secured to the primary mobile frame 1 are adapted to be telescopically received within a like number of tubular coupler sleeves 104 rigidly secured to the adjacent side of the secondary mobile frame 92.

As above indicated, when the primary frame 1 is secured to the secondary frame 92, the skid 5 is elevated from the ground through the medium of the screw jack 7. Also at such a time, the wheel 95 is likewise elevated from the ground by manipulation of the screw jack 105, so that when the two frames 1 and 92 are coupled together, only caster wheels 93, wheel 94, and wheel 2 are in contact with the ground. As shown, the frame 92 is provided with upstanding opposite bale confining side portions 106 and 107, respectively, whereas the bales are prevented from accidentally falling out the forward end thereof by means of a guard rail 108. As shown, rectangular frame 92 slopes rearwardly and has longitudinally spaced roller elements 109 from its intermediate to its rear end portion, defining a loading platform. A roller equipped transfer platform 110 is shown as being pivotally secured to the frame 92 adjacent the feed roller 88, as indicated at 111. As shown, the pivot point 111 is forwardly spaced with respect to the center of gravity of said transfer platform 110. The opposite side of transfer platform 110 is provided with means for supporting same on the frame 92 in a plane lower than the bale receiving side thereof, including a fulcrum-forming member 112 rearwardly of the center of gravity of said transfer platform 110, see Figs. 1 and 4, and an arcuate track-forming element 113 interposed between the frame 92, and the upstanding bale supporting side 106, and a guide pin 114 projecting laterally outwardly from the side of the transfer platform 110 and receivable in the track defining member 113. It will be noted that the track 113 defines an arc, the center of which coincides with the fulcrum-forming member 112. A suitable coil tension spring 115 forwardly of pivot 111 biases said transfer platform 110 toward its bale receiving position in which each end is horizontally disposed with respect to the longitudinal axis of frame 92. Furthermore, the transfer platform 110 is normally locked in said horizontal bale receiving position by means of a bell crank type locking lever 116 which is pivoted, as at 117, to a bracket 118 upstanding from the end of the transfer platform 110 adjacent the upstanding bale supporting side 106. As shown, locking lever 116 is provided with a latch forming end 119 adapted to underlie and engage the frame 92. Coil tension spring 120 biases said lever 16 toward a frame engaging position, whereas the cam face 121 permits the transfer platform 110 to return to its horizontal bale receiving position from the forwardly rocked bale transfer position.

As successive stacks of bales X are ejected from the stacking chamber 37 and positioned in side by side relation upon the transfer platform 110, which slopes in the direction of bale confining side 106, the first stack, by engagement with the subsequent stacks, is eventually forced against the upper end 122 of the bell crank locking lever 116 whereby to move same to the dotted line position of Fig. 5 and to permit forward rocking movements of the transfer platform 110 about the pivot axis 111 (which is, as above indicated, forwardly spaced with respect to the center of gravity). Thereafter, the platform 110 is rocked rearwardly to the dotted line position of Fig. 3, and a row of stacks of bales X substantially the width of the frame 92 will be deposited upon the longitudinally spaced roller elements 109. This row of stacks will travel down the loading platform 92 until they come into contact with a releasable tail gate 123. Successive rows of stacks will result in the entire roller equipped portion of the frame 92 being loaded. At this point, the driver may drive to a desired location, at which point the entire load comprising a series of rows of stacks in side by side relation may be deposited upon the ground by manually releasing a rocking lever 124 from a conventional latch mechanism 125 secured to the frame 92 and yieldingly biased toward a locking engagement therewith by means of a sear spring 126. As shown, rocking lever 24 is secured to the pivotally mounted transverse gate 127 extended transversely of the frame 92 and mounted in bearings 128. The laterally-spaced vertically extended portion of the gate 123 is identified by the numeral 129.

While I have disclosed a preferred embodiment of my invention, it should be obvious that same is capable of considerable modification without departure from the spirit of the invention as defined by the appended claims.

What I claim is:

1. In a bale loading and stacking machine, a mobile frame, an inclined bale loading conveyor on said frame, means to elevate bales along said conveyor, means for connecting said frame to a power vehicle, means defining a stacking chamber for the reception of bales from said conveyor, an elongated supporting shelf adjacent one side of said chamber adapted to slidably receive bales from said conveyor and position same horizontally over said chamber, a generally U-shaped bale supporting element journalled on a horizontal axis in said frame adjacent the opposite side of said chamber for swinging movements between bale engaging and bale releasing positions, yielding means biasing said bale supporting element toward a bale engaging position, a latch arm operatively associated with one end of said U-shaped supporting member, a latch operatively engageable with said latch arm to lock said U-shaped element in bale supporting position, a bale engaging arm disposed in the path of travel of bales entering said chamber from said conveyor, and connections between said arm and said latch operative with respect to engagement of said bale engaging arm by said bales to unlatch said bale supporting element, whereby to permit a bale supported thereby to drop into said chamber.

2. In a bale loading and stacking machine, a mobile primary frame, an inclined bale loading conveyor on said frame, cams to elevate bales along said conveyor, means defining a stacking chamber for the reception of bales from said conveyor, one side of said chamber comprising cooperating gate elements, yielding means biasing said gate elements toward a closed position, means positively locking said gate elements in a closed position, mechanism for opening said gates against said bias when a predetermined number of bales are stacked within said chamber, mechanism including a power driven rotary member for moving said stacked bales laterally outwardly through said gates, a secondary mobile frame, means for detachably securing said secondary frame to said primary frame in laterally off-set relation thereto, whereby to receive the stacked bales from said chamber, said secondary frame including an elongated generally rectangular rearwardly sloping roller-equipped loading platform, and a roller equipped transverse transfer platform on the forward end of said secondary frame mounted for rocking movements from a longitudinally horizontal stack receiving position to a rearwardly sloping stack transfer position.

3. The structure defined in claim 2 in which said secondary frame is provided with upstanding bale confining opposite side members, and in which said transfer platform is pivotally secured to said secondary frame forwardly of its center of gravity, and in further combination with yielding means biasing said transfer platform towards said horizontal stack receiving position.

4. The structure defined in claim 3 in further combination with means positively locking said transfer platform in said horizontal stack receiving position, and means engageable with bales moved onto said transfer platform from said stacking chamber to release said locking means.

5. The structure defined in claim 2 in which said transfer platform is pivotally secured to said secondary frame adjacent its bale receiving side on a horizontal axis forwardly of its center of gravity, and in further combination with means for supporting the opposite side of said transfer platform in a plane lower than the receiving side thereof.

6. The structure defined in claim 5 in which the means for supporting said opposite side of the transfer platform comprises a fulcrum-forming member rearwardly of the center of gravity of said transfer platform, and means for guiding said opposite side of the transfer platform for swinging movements about said fulcrum.

7. The structure defined in claim 6 in which said guide means comprises an arcuate track and a cooperating guide pin, one mounted on said secondary frame and one on said transfer platform, said arcuate track defining an arc the center of which coincides with said fulcrum.

8. In a device for gathering stacked bales, an elongated generally rectangular mobile frame, the rear portion of said frame being provided with longitudinally-spaced roller elements and defining a rearwardly sloping stack loading platform, releasable gate means extending transversely across the rear end portion of said frame for limiting rearward movements of stacked bales supported thereon, a transfer platform extending transversely across the forward end of said frame and pivotally secured thereto on a horizontal axis for rocking movements from a longitudinally horizontal stack receiving position to a rearwardly sloping stack transfer position, said horizontal axis being forwardly spaced with respect to the center of gravity of said transfer platform, means yieldingly biasing said platform toward said horizontal stack receiving position, and releasable means positively locking said transfer platform in its load receiving position.

9. The structure defined in claim 8 in which the pivotal connection of said transfer platform to said frame is adjacent its stack receiving side, and in further combination with means for supporting the opposite side of said transfer platform in a plane lower than the receiving side thereof, said last mentioned supporting means including a fulcrum forming member rearwardly of the center of gravity of said transfer platform and means for guiding said opposite side of the transfer platform for swinging movements about said fulcrum.

10. The structure defined in claim 9 in which said guide means comprises an arcuate track and a cooperating guide pin, one mounted on said frame and one on said transfer platform, said arcuate track defining an arc, the center of which coincides with said fulcrum.

11. In a bale loading and stacking machine, a mobile frame, an inclined bale loading conveyor on said frame, means to elevate bales along said conveyor, means for connecting said frame to a power vehicle, means defining a stacking chamber for the reception of bales from said conveyor, one side of said chamber comprising cooperating gate elements, yielding means biasing said gate elements toward a closed position, means positively locking said gate elements in a closed position, yielding means including a sidewall element, means pivotally mounting said side wall element adjacent the upper end of the chamber, and a spring interposed between said frame and said side wall element biasing bales within said chamber toward said gate elements, means responsive to movements of a predetermined number of bales from said conveyor toward said stacking chamber for releasing said locking means, the bias exerted against said bales toward said gate elements being greater than the bias exerted on said gate elements, whereby when said locking mechanism is released said bales will cause said gates to open, a bottom wall element for said chamber, means pivotally mounting said bottom element adjacent said roller, and yielding means interposed between the free end of said bottom element and said frame and biasing said free end upwardly, whereby to provide a sloping platform for said bales from said side wall element toward said roller.

12. In a bale loading and stacking machine, a mobile frame, and inclined bale loading conveyor on said frame, means to elevate bales along said conveyor, means for connecting said frame to a power vehicle, means defining a stacking chamber for the reception of bales from said conveyor, one side of said chamber comprising cooperating gate elements, yielding means biasing said gate elements toward a closed position, means positively locking said gate elements in a closed position, yielding means biasing bales within said chamber toward said gate elements, means responsive to movements of a predetermined number of bales from said conveyor towards said stacking chamber for releasing said locking means, the bias exerted against said bales toward said gate elements being greater than the bias exerted on said gate elements, whereby when said locking mechanism is released said bales will cause said gates to open, said gate elements including opposed U-shaped gates which are journalled at their upper and lower end portions in said frame structure for swinging movements about vertical axes, said means positively locking said gate elements in a closed position including a latch lever intermediate said gates and mounted on said frame above said gates on a horizontal axis, said gates being provided with normally opposed locking arms engaging said latch lever, and yielding means biasing said latch lever in a direction to lock said arms against movement in a gate-opening direction, and said means responsive to movements of said bales from said conveyor toward said stacking chamber for releasing said stacking means including a bale engaging arm disposed in the path of travel of bales entering said chamber from said conveyor, a pawl on said arm, a rotary ratchet engaged by said pawl, a multi-lobe cam operatively connected with said ratchet for common rotary movements therewith, and a tripping arm for said latch lever pivotally connected intermediate its ends to said frame, one end of said tripping arm engaging said latch lever, and the other end thereof being engageable with said cam movable thereby in a latch-releasing direction.

References Cited in the file of this patent

UNITED STATES PATENTS

| | | |
|---|---|---|
| 1,818,652 | Scott | Aug. 11, 1931 |
| 1,916,531 | Robb | July 4, 1933 |
| 2,453,384 | Renken | Nov. 9, 1948 |
| 2,482,160 | Donogh | Sept. 20, 1949 |
| 2,531,560 | De Wall | Nov. 28, 1950 |
| 2,615,586 | Miller et al. | Oct. 28, 1952 |
| 2,633,794 | Rothrock | Apr. 7, 1953 |